United States Patent
Minami et al.

(10) Patent No.: US 9,983,074 B2
(45) Date of Patent: May 29, 2018

(54) FORCE DETECTOR

(71) Applicant: Hokuriku Electric Industry Co., Ltd., Toyoma-shi, Toyama (JP)

(72) Inventors: Masayoshi Minami, Toyama (JP); Tsutomu Sawai, Toyama (JP)

(73) Assignee: HOKURIKU ELECTRIC INDUSTRY CO., LTD., Toyama-Shi (JP)

( * ) Notice: Subject to any disclaimer, the term of this patent is extended or adjusted under 35 U.S.C. 154(b) by 44 days.

(21) Appl. No.: 15/321,325

(22) PCT Filed: Jun. 26, 2015

(86) PCT No.: PCT/JP2015/068544
§ 371 (c)(1),
(2) Date: Dec. 22, 2016

(87) PCT Pub. No.: WO2015/199228
PCT Pub. Date: Dec. 30, 2015

(65) Prior Publication Data
US 2017/0160149 A1   Jun. 8, 2017

(30) Foreign Application Priority Data
Jun. 27, 2014   (JP) .................... 2014-132609

(51) Int. Cl.
*G01L 5/00* (2006.01)
*G01L 1/26* (2006.01)
(Continued)

(52) U.S. Cl.
CPC ............... *G01L 1/26* (2013.01); *G01L 5/00* (2013.01); *G01L 1/18* (2013.01); *G01L 9/0052* (2013.01);
(Continued)

(58) Field of Classification Search
CPC ......... G01L 1/18; G01L 1/26; G01L 19/0069; G01L 19/0061; G01L 19/0084;
(Continued)

(56) References Cited

U.S. PATENT DOCUMENTS 4,656,454 A * 4/1987 Rosenberger ....... G01L 19/0084
  29/621.1
6,150,917 A * 11/2000 Meyer .................. G01L 9/0054
  29/621

(Continued)

FOREIGN PATENT DOCUMENTS

| JP | 2007-248212 | 9/2007 |
|---|---|---|
| JP | 2011-169717 | 9/2011 |
| JP | 2011-220865 | 11/2011 |

OTHER PUBLICATIONS

International Search Report, dated Aug. 25, 2015 (Aug. 25, 2015).

*Primary Examiner* — Jonathan Dunlap
(74) *Attorney, Agent, or Firm* — Rankin, Hill & Clark LLP

(57) ABSTRACT

A force detector capable of preventing short-circuit fault between electrodes and allowing for downsizing. A prescribed region encompasses a projection region defined by projecting a deformation region of a force sensor element, which is deformed when a force transmission member applies a force to the force sensor element, onto a base substrate. A plurality of terminals are provided by four soldering land electrodes formed, respectively, at four corners of the base substrate. The soldering land electrodes are shaped such that a portion of each soldering land electrode is located within the projection region to form a soldering portion.

7 Claims, 4 Drawing Sheets

(51) Int. Cl.
  *G01L 19/00* (2006.01)
  *G01L 19/14* (2006.01)
  *G01L 9/00* (2006.01)
  *G01L 1/18* (2006.01)

(52) U.S. Cl.
  CPC ........ *G01L 9/0054* (2013.01); *G01L 19/0061* (2013.01); *G01L 19/0069* (2013.01); *G01L 19/0084* (2013.01); *G01L 19/142* (2013.01); *G01L 19/147* (2013.01); *G01L 19/148* (2013.01)

(58) Field of Classification Search
  CPC ... G01L 19/148; G01L 19/142; G01L 19/147; G01L 9/0052; G01L 9/0054; G01L 5/00
  USPC ..... 73/862.627, 862.632, 862.381, 777, 721, 73/756, 727
  See application file for complete search history.

(56) References Cited

U.S. PATENT DOCUMENTS

| | | | | |
|---|---|---|---|---|
| 6,874,377 B2* | 4/2005 | Karbassi | ............... | G01L 1/2231 73/862 |
| 7,234,359 B2* | 6/2007 | Hirose | ...................... | G01L 1/18 73/777 |
| 7,360,440 B2* | 4/2008 | Hirose | ...................... | G01L 1/18 73/777 |
| 7,591,186 B1* | 9/2009 | Boyer | ................. | G01L 19/0061 73/756 |
| 7,640,807 B2* | 1/2010 | Tamura | ............... | G01L 19/0069 73/514.33 |
| 7,930,944 B2* | 4/2011 | Machir | ................. | G01L 19/148 73/753 |
| 8,297,127 B2* | 10/2012 | Wade | ................. | G01L 19/0038 73/721 |
| 8,316,725 B2* | 11/2012 | Wade | ........................ | G01L 1/18 73/760 |
| 9,003,899 B2* | 4/2015 | Wade | ........................ | G01L 1/18 73/760 |
| 2005/0217386 A1* | 10/2005 | Hirose | ...................... | G01L 1/18 73/763 |
| 2007/0234804 A1* | 10/2007 | Tamura | ............... | G01L 19/0069 73/526 |
| 2007/0234827 A1* | 10/2007 | Hirose | ...................... | G01L 1/18 73/862.627 |
| 2009/0282925 A1* | 11/2009 | Machir | ................. | G01L 19/148 73/756 |
| 2012/0152037 A1* | 6/2012 | Wade | ........................ | G01L 1/18 73/862.627 |
| 2012/0174680 A1* | 7/2012 | Wade | ................. | G01L 19/0038 73/721 |
| 2013/0247690 A1* | 9/2013 | Wade | ................... | G01L 9/0052 73/862.632 |
| 2014/0083209 A1 | 3/2014 | Wade et al. | | |

\* cited by examiner

Fig. 4a
Fig. 4b
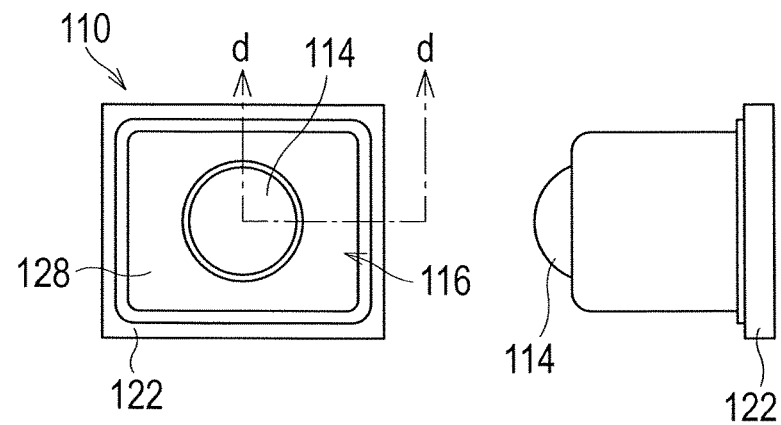
Fig. 4c
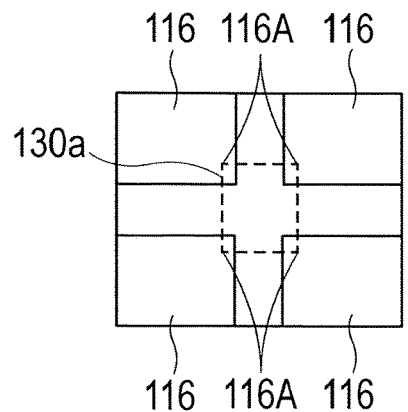
Fig. 4d
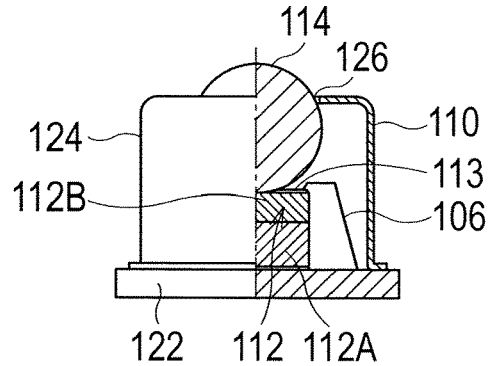

FORCE DETECTOR

TECHNICAL FIELD

The present invention relates to a force detector capable of outputting a signal according to the magnitude of an applied force, specifically to a force detector capable of preventing short-circuit fault between electrodes and allowing for downsizing.

BACKGROUND ART

There have been practically used force detectors in which a force is applied to a spherical force transmission member and transmitted to a force sensor element, which in turn outputs a signal according to the magnitude of the transmitted force. The spherical force transmission member and the force sensor element are received in a casing. An uppermost portion of the spherical force transmission member protrudes outwardly out of a through hole formed in a top wall portion of the casing. The force sensor element is disposed between an inner surface of a bottom wall portion of the casing and a lowermost portion of the spherical force transmission member. At the bottom wall portion (or a side wall portion in the vicinity of the bottom portion) of the casing, input-output terminals are connected to the force sensor element and externally exposed. A substrate is disposed on an outer surface side of the bottom wall portion. The input-output terminals are soldered to the substrate. Thus, the force detector is mounted on the substrate.

As disclosed in JP2011-169717A (Patent Document 1), a soldering portion is provided at an opposite position to the lowermost portion of the spherical force transmission member in order to eliminate or reduce unevenness in detection accuracy due to bending or deflection of the bottom wall portion of the casing when soldering a small-sized force detector onto the substrate. At the soldering portion, the bottom portion of the casing is soldered onto the substrate, thereby filling a gap between the bottom wall portion and the substrate as caused when soldering the input-output terminals of the force detector to electrodes disposed on the substrate. This prevents a part of the applied force from being absorbed as the bottom wall portion located below the force sensor element is deflected when a downward force is applied to the force sensor element via the spherical force transmission member located above the force sensor element. Thus, unevenness in detection accuracy can be suppressed.

The principle of how to prevent unevenness in detection accuracy is illustrated in FIG. 3. FIG. 3 illustrates only the bottom wall portion 42 of the casing. As illustrated in FIG. 3a, the force sensor element 40 is disposed at a central portion of the inner surface of the bottom wall portion 42 of the casing. As illustrated in FIG. 3b, soldering land patterns are formed on an outer surface of the bottom wall portion 42. According to the soldering land pattern formed on the substrate, the force sensor element is connected to soldering electrodes, not illustrated, via solder portions 44, 46 on the substrate 48. FIG. 3b illustrates the land pattern formed on the outer surface of the bottom wall portion 42. Four land patterns 50 are disposed respectively in the vicinity of four corners of the outer surface of the square bottom wall portion 42 and work as input-output terminals of the force sensor element 40. The four land patterns 50 are connected respectively to the electrodes disposed on the substrate 48 by solder portions 44. In contrast, the land pattern 52 is not electrically connected to the force sensor element 40 and works to fill a part of the gap between the outer surface of the bottom wall portion 42 and the substrate 48 with a solder portion 46. Namely, since the bottom wall portion 42 is supported with respect to the substrate 48 only by the solder portions 44 in the vicinity of the four corners, a central portion of the bottom wall portion 42 would be deflected toward the substrate 48 without the solder portion 46 located at the position of the land pattern 52 when a downward force f is applied to the force sensor element 40 as illustrated in FIG. 3a. Thus, at least a part of the downward force f would be absorbed, thereby causing unevenness in detection accuracy. With the solder portion 46, the bottom wall portion 42 will not be deflected, thereby enabling the force sensor element 40 to output a signal accurately according to the magnitude of the force f.

JP2011-220865A (Patent Document 2) discloses a configuration in which fixing terminals are provided on the back surface of a package substrate of a force sensor package, planarly overlapping adhesion fixing positions of a sensor structure. Especially in FIGS. 6b and 6c illustrating a specific configuration, an SMD terminal 31 and a fixing terminal 32 are integrally provided to constitute a common terminal 33.

RELATED ART

Patent Documents

Patent Document 1: JP2011-169717A
Patent Document 2: JP2011-220865A

SUMMARY OF INVENTION

Technical Problems

A force detector soldered onto the substrate is needed to be removed from the substrate for replacement and maintenance, etc. When removing the force detector illustrated in FIG. 4 from the substrate, heat is applied to the solder to let it be fused. The solder portions 44 disposed at four corners of the bottom wall portion 42 are located in the vicinity of an outer periphery of the bottom wall portion 42. Therefore, the solder portions 44 can directly be heated by applying a soldering iron to the electrodes disposed on the substrate 48 or the solder portions 44 attached to the electrodes. The solder portion 46, however, disposed at the central portion of the bottom wall portion 42 cannot directly be heated with a soldering iron.

As disclosed in patent Document 2, the common terminal, which is formed of an SMD terminal and a fixing terminal and disposed on the back surface of the package, allows the heat of the soldering iron to be transferred to the fixing terminal portion by applying the soldering iron to the SMD terminal. When a common terminal of this kind is employed, the further downsizing is promoted, the shorter the distance between the fixing terminal and other SMD terminals will be, thereby increasing a risk of short-circuit fault between the terminals (electrodes).

An object of the present invention is to provide a force detector capable of preventing inter-electrode short-circuit fault and allowing for downsizing.

Solution to Problems

A force detector of the present invention comprises a base substrate; a force sensor element mounted on a front surface of the base substrate; a force transmission member operable to transmit a force to the force sensor element; and a plurality of solderable terminals (or terminals that can be soldered) provided on a back surface of the base substrate and externally exposed. Further, a soldering portion is provided on the back surface of the base substrate and formed of a solderable material in a prescribed region centering on a position at which an imaginary extension line of a force, which is applied to the force sensor element from the force transmission member, passes through the base substrate.

In the present invention, the prescribed region encompasses a projection region defined by projecting a deformation region of the force sensor element, which is deformed when the force transmission member transmits a force to the force sensor element, onto the base substrate. The plurality of solderable terminals are terminal electrodes comprised of four soldering land electrodes formed respectively at four corners of the base substrate. The four soldering land electrodes are shaped such that a part of each of terminal electrodes is located within the projection region to form the soldering portion. In the present invention, a part of each of the four soldering land electrodes constitutes the soldering portion. According to the present invention, unlike in the prior art, a dedicated soldering portion need not be provided in the projection region, thereby eliminating the need of providing a space for a dedicated soldering portion on the back surface of the base substrate. Thus, according to the present invention, downsizing of the force detector can be promoted more than ever.

When mounting the force detector of the present invention on a substrate by means of soldering, it is possible to prevent the substrate from being bending or deflected due to a force applied from the force transmission member to the force sensor element. This is accomplished by soldering the soldering portion, which is formed in the prescribed region centering on the position at which the imaginary extension line of the force applied passes the substrate, to the electrodes disposed on the mounting substrate. When removing the force detector from the mounting substrate, any one of the terminals of the force detector is heated to fuse the solder attached to the soldering portion. Even when the soldering portion is provided in the prescribed region to suppress the deflection of the bottom wall portion of the casing, the solder attached to the soldering portion can be fused by externally applying the heat to the terminals of which a part constitutes the soldering portion, thereby enabling the removal of the force detector from the substrate.

A part of each of the four soldering land electrodes that constitutes the soldering portion is shaped and sized according to the configuration of the force detector. In other words, a part of each of the four soldering land electrodes that constitutes the soldering portion is shaped and sized, taking into consideration the dimensions, shapes, and material qualities of the entirety of force detector, and each parts and members used in the force detector, especially, the shape of the bottom surface portion of the force sensor element, the thickness and material quality of the bottom wall portion of the casing, an area occupied by the force sensor element and the position thereof on the inner surface of the bottom wall portion of the casing.

For the prevention of short-circuit fault, two adjacent terminal electrodes among the four soldering land electrodes are preferably distant from each other by 0.1 mm or more. The inter-electrode distance (the distance between electrodes) can furthermore be reduced by improving soldering techniques.

Specifically, for example, the outline shape of each of the four soldering land electrodes is rectangular. In this case, the outline shape is preferably determined such that one of corner portions of each soldering land electrode is located within the projection region.

The force sensor element may be constituted from a semiconductor force sensor element having a plurality of diffusion resistances formed in a deformation region. The force transmission member may be spherical.

The terminals of the force detector may not only directly be heated, but also the soldering portion may indirectly be heated by heating the electrodes disposed on the substrate.

DESCRIPTION OF DRAWINGS

FIG. 1 illustrates an example force detector according to an embodiment of the present invention. Specifically, FIG. 1b is a cross sectional view as taken along b-b line of FIG. 1a.

FIGS. 4a to 4d are a plan view, a right side view, a bottom view, and a cross sectional view as taken along d-d line of FIG. 4a, respectively, according to a still further embodiment of the present invention.

DESCRIPTION OF EMBODIMENTS

Embodiments of the present invention will be described below in detail with reference to the accompanying drawings.

Figure 1A:
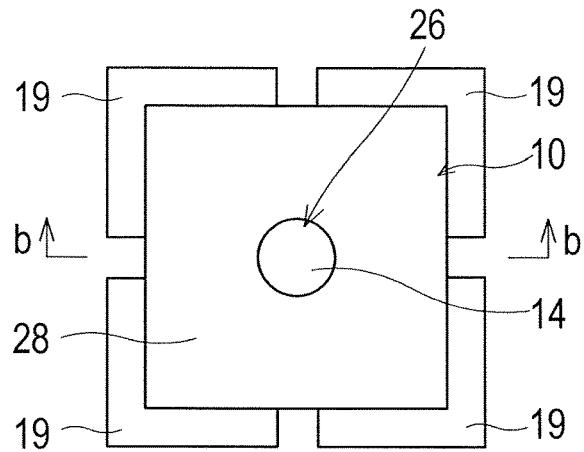
FIG. 1a is a plan view illustrating that the force detector is mounted on the substrate.
Figure 1B:
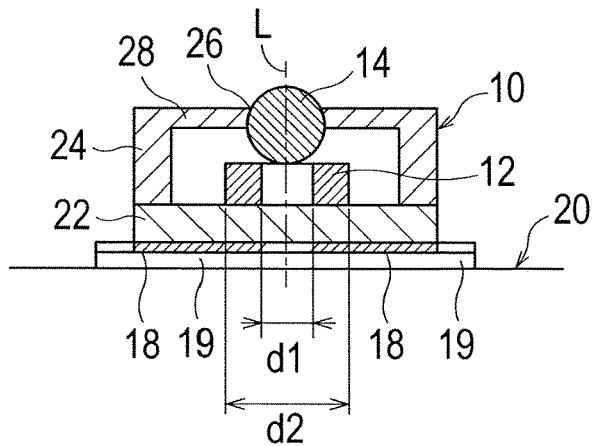
Figure 1C:
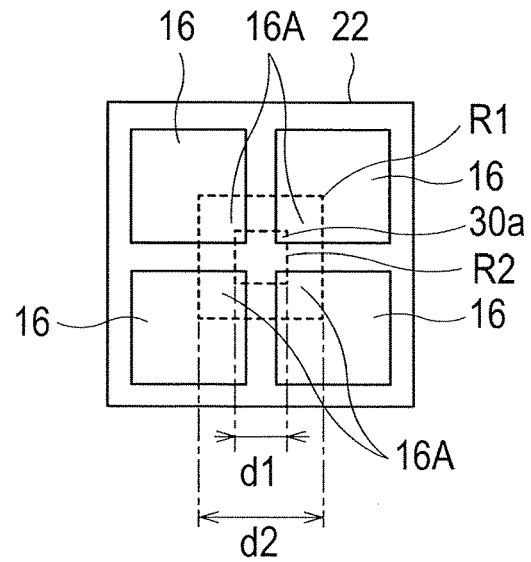
FIG. 1c illustrates land electrodes formed on the outer surface of the bottom wall portion of the casing.

As illustrated in FIGS. 1a and 1b, a force detector of the present invention comprises a casing 10, a force sensor element 12 received inside the casing 10, a force transmission sphere 14 that works as a force transmission member operable to transmit a force to the force sensor element 12, and four land electrodes 16 (as illustrated in FIG. 1c) that are solderable and externally exposed and fixed onto the casing 10.

The casing 10 includes a bottom wall portion formed of a base substrate 22, a peripheral wall portion 24, and a top wall portion 28. The force sensor element 12 is disposed on an inner wall surface, namely, a front surface of the base substrate 22 of the casing 10. The four soldering land electrodes 16 each having a rectangular outline shape are fixed onto an outer wall surface, namely, a back surface of the base substrate 22. As illustrated in FIG. 1b, the peripheral wall portion 24 extends upwardly from an outer periphery of the base substrate 22. The peripheral wall portion 24 has a rectangular outline shape as viewed from above. As illustrated in FIG. 1b, the top wall portion 28 extends horizontally to cover an opening defined by the peripheral wall portion 24, and has a through hole 26 formed at a central portion thereof.

The force transmission sphere 14 includes an upper portion protruding outwardly out of the through hole 26 of the top wall portion 28 and a lower portion abutting on the force sensor element 12 to transmit a force applied from above to the force sensor element 12.

The force sensor element 12 is a semiconductor force sensor element. The semiconductor force sensor is constructed such that four diffusion resistances are formed to constitute a bridge circuit in a diaphragm region (a deformation region) by diffusing boron or the like on a silicon substrate. The semiconductor force sensor is operable to convert a force transmitted by the force transmission sphere 14 into an electric signal by means of piezo effect and to output the signal.

As illustrated in FIG. 1c, the force detector has four separate soldering land electrodes 16 formed on the outer surface of the bottom wall portion 22. The soldering land electrodes 16 work as four input-output terminals (Vcc, +OUTPUT, GND, and −OUTPUT) for the bridge circuit. As illustrated in FIG. 1c, the four soldering land electrodes 16 are formed respectively at four corners of the base substrate 22 of the casing 10. The four soldering land electrodes 16 each has a square shape and are sized such that four squares may cover a majority of the back surface of the base substrate 22. The four soldering land electrodes 16 are formed to expose an electrode pattern comprised of a metal having good solder wettability on the back surface of the base substrate 22. In the present embodiment, the soldering land electrodes 16 each have four corner portions, and one corner portion 16A of the four corner portions of each of the soldering land electrodes 16 is disposed at a central portion of the base substrate 22. Four corner portions 16A of the soldering land electrodes 16 form a soldering portion 30a.

The shape of each land electrode is depicted in in FIG. 1c such that four corner portions 16A of the four soldering land electrodes 16 are located within a prescribed region R1 centering on a position at which an imaginary extension line of the force applied to the force sensor element 12 from the force transmission sphere 14 passes the base substrate 22. As illustrated in FIGS. 1b and 1c, the prescribed region R1 of the present embodiment has a rectangular outline shape with a dimension d2 of one side as defined by projecting an outer outline of a bottom surface of the force sensor element 12 onto the back surface of the base substrate 22. The soldering portion 30a constituted from four corner portions 16A is encompassed in a projection region R2 having a rectangular outline shape with a dimension d1 of one side as defined by projecting a deformation region (a diaphragm portion) of the force sensor element 12, which is deformed when the force transmission sphere 14 transmits a force to the force sensor element 12, onto the base substrate 22. Namely, one corner portion 16A, which is the closest to the center of the square outer surface of the base substrate 22 among four corner portions of each of four land electrodes 16, is located within the projection region R2.

As illustrated in FIG. 1a, the soldering land electrodes 16 are joined to soldering electrodes 19 disposed on a front surface of a mounting substrate 20 via solder portions 18. A gap among the soldering electrodes 19 disposed on the mounting substrate 20 and a gap among the four soldering land electrodes 16 are sized such that adjacent soldering electrodes 19 or adjacent soldering land electrodes 16 may not be shorted by the solder portions 18. Specifically, for the prevention of short-circuit fault, two adjacent land electrodes 16 are disposed apart from each other by 0.1 mm or more. Two adjacent soldering electrodes 19 are also disposed apart from each other by 0.1 mm or more.

The force sensor element 12 is mounted on the mounting substrate 20 by connecting the four land electrodes 16 and the soldering electrodes 19 by the solder portions 18. A force applied to the force sensor element 12 is transmitted to the mounting substrate 20 via the soldering portion 30a. As a result, the deflection of the base substrate 22 can be prevented or suppressed.

In the force detector of the present embodiment that is mounted on the mounting substrate 20, since the soldering portion 30a is formed of a part of each of the four soldering land electrodes 16, the solder portions 18 attached to the soldering portion 30a is fused by applying heat to each soldering land electrode 16. Thus, the force detector can readily be removed from the mounting substrate 20 by heating each soldering land electrode 16. In the present embodiment, the soldering land electrodes 16 are disposed closer to the center of the back surface of the base substrate 22 than the periphery of the base substrate 22. For this reason, the soldering land electrodes 16 cannot directly be heated, but can indirectly be heated by applying an iron to the soldering electrodes disposed on the mounting substrate 20.

A land electrode pattern including the soldering portions is preferably symmetric so as to suppress the deflection of the bottom wall portion without deviation as much as possible. As illustrated in FIG. 1c, for example, the land electrode pattern formed on the outer surface of the square base substrate 22 is line symmetric relative to two center-lines respectively connecting the center points of two pairs of opposed sides of a square and also relative to two diagonal lines of the square, and is point symmetric relative to the center point of the square.

Figure 2A:
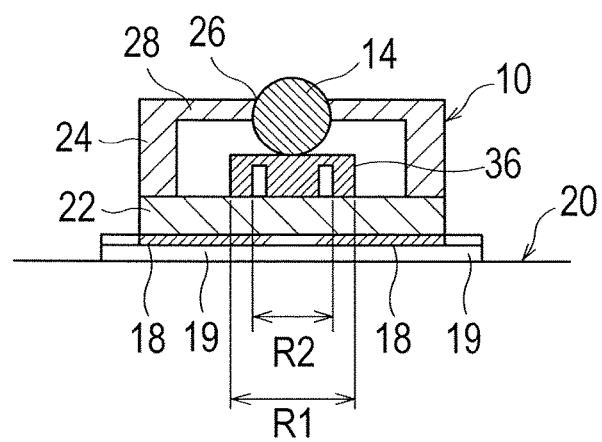
FIGS. 2a and 2b illustrate another embodiment and a further embodiment of the present invention, respectively. The figures are similar to FIG. 1b.
Figure 2B:
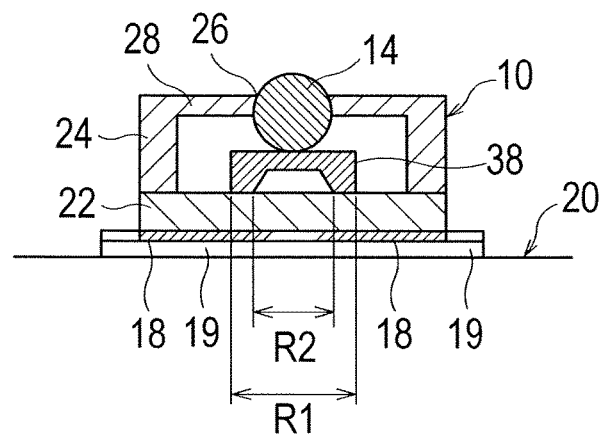
Figure 3A:
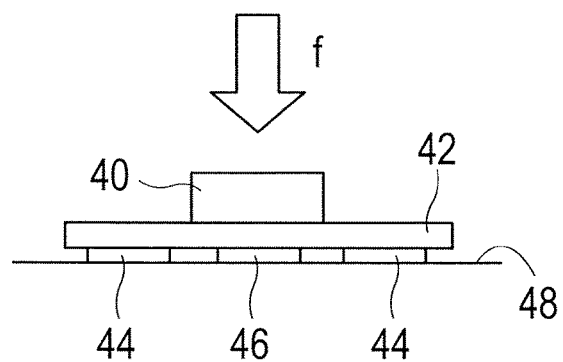
FIGS. 3a and 3b are illustrations used to explain the principle of preventing unevenness in detection accuracy in a conventional force detector.
Figure 3B:
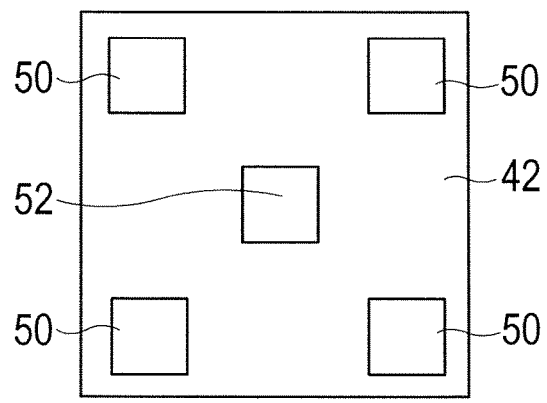

The range of the prescribed region within which the soldering portion is formed and the range of the projection region depend upon the kind of a force detector. FIGS. 2a and 2b each illustrate a force detector which is equipped with a force sensor element different in configuration from the force sensor element 12 of FIG. 1.

Compared with the force sensor element 12 of FIG. 1, a force sensor element 36 of a force detector of FIG. 2a has a slightly wider deformation region. Accordingly, the projection region R2 is slightly wider than the projection region R2 of FIG. 1c. Also compared with the force sensor element 12 of FIG. 1, a force sensor element 38 of a force detector of FIG. 2b has a deformation region formed of a diaphragm of which the periphery is supported by a pedestal. Here again, the projection region R2 is slightly wider than the projection region R2 of FIG. 1c.

FIGS. 4a to 4d are a plan view, a right side view, a bottom view, and a cross sectional view, as taken along d-d line of FIG. 4a, of a force detector according to another embodiment of the present invention. In this embodiment, counterparts are allocated reference numerals obtained by adding 100 to those of the parts of the force detector according to the embodiment of FIG. 1 and the description thereof is omitted. In comparison, the configuration of a force sensor element 112, the structure of a casing 110, and the shape and location of each of the soldering land electrodes 116 in the embodiment of FIG. 4 are different from those in the embodiment of FIG. 1. The force sensor element 112 is constructed such that a semiconductor force sensor element 112B is mounted on a glass pedestal 112A. A gel protective layer 113 is formed on the semiconductor force sensor element 112B. The casing 110 is constituted from a metallic cap and a circuit substrate. The circuit substrate constitutes a base substrate 122. The semiconductor force sensor element 112B is connected by wire bonding 106 to electrodes disposed on the circuit substrate which constitutes the base substrate 122. Especially in this embodiment, soldering land electrodes 116 formed on a back surface of the rectangular circuit substrate, which constitutes the base substrate 122 of the casing 110, are rectangular in shape. The soldering land electrodes 116 are formed, exactly coinciding with the corner portions of the rectangular bottom surface. As a result, heat can externally be applied directly to the soldering land electrodes 116 when removing the force detector from the mounting substrate in this embodiment. The relationship between the position and dimension of the land electrodes 116 and those of the force sensor element 116, and the distance between adjacent soldering land electrodes 116 are determined in the same manner as the embodiment mentioned earlier. Therefore, in this embodiment, four corner portions 116A out of respective four corner portions of the four soldering land electrodes 116 are disposed at a central portion of the base substrate 122 to form a soldering portion 130a. For the prevention of short-circuit fault, the four land electrodes 116 are disposed such that two adjacent electrodes are distant from each other by 0.1 mm or more.

INDUSTRIAL APPLICABILITY

According to the present invention, a part of each of four soldering land electrodes is located in a projection region defined by projecting a deformation region of the force sensor element, which is deformed when the force transmission member transmits a force to the force sensor element, onto the base substrate, and those parts of the respective soldering land electrodes all together form a soldering portion. Unlike in the prior art, a dedicated soldering portion need not be provided in the projection region, thereby eliminating the need of providing a space for a dedicated soldering portion on the back surface of the base substrate. Thus, according to the present invention, downsizing of the force detector can be promoted more than ever. According to the force detector of the present invention, it is possible to prevent unevenness in detection accuracy by providing a soldering portion in the prescribed region to suppress the deflection of the bottom wall portion of the casing. Further, it is possible to remove the force detector from the substrate by applying heat to the terminals to fuse the solder attached to the soldering portion.

SIGN LISTING

R2 Projection region
R1 Prescribed region
10, 110 Casing
12, 112 Force sensor element
14, 114 Force transmission sphere
16, 116 Soldering land electrode
18 Solder
20 Substrate
22, 122 Base substrate (bottom wall portion)
24 Peripheral wall portion
26 Through hole
28 Top wall portion
30a, 30b, 130a Soldering portion
36, 38 Force sensor element

The invention claimed is:

1. A force detector comprising:
a base substrate;
a force sensor element mounted on a front surface of the base substrate;
a force transmission member operable to transmit a force to the force sensor element;
a plurality of solderable terminals provided on a back surface of the base substrate and externally exposed; and
a soldering portion provided on the back surface of the base substrate and formed of a solderable material in a prescribed region centering on a position at which an imaginary extension line of a force, which is applied to the force sensor element from the force transmission member, passes through the base substrate, wherein:
the prescribed region encompasses a projection region defined by projecting a deformation region of the force sensor element, which is deformed when the force transmission member transmits a force to the force sensor element, onto the base substrate;
the plurality of solderable terminals are terminal electrodes comprised of four soldering land electrodes formed respectively at four corners of the base substrate; and
the four soldering land electrodes are shaped such that a part of each of the terminal electrodes is located within the projection region to form the soldering portion.

2. The force detector according to claim 1, wherein two adjacent terminal electrodes among the four soldering land electrodes are distant from each other by 0.1 mm or more.

3. The force detector according to claim 2, wherein:
an outline shape of each of the four soldering land electrodes is rectangular; and
one of corner portions of each of the four soldering land electrodes is located within the projection region.

4. The force detector according to claim 3, wherein:
the force sensor element is constituted from a semiconductor force sensor element having a plurality of diffusion resistances formed in a deformation region; and
the force transmission member is spherical.

5. The force detector according to claim 2, wherein:
the force sensor element is constituted from a semiconductor force sensor element having a plurality of diffusion resistances formed in a deformation region; and
the force transmission member is spherical.

6. The force detector according to claim 1, wherein:
the force sensor element is constituted from a semiconductor force sensor element having a plurality of diffusion resistances formed in a deformation region; and
the force transmission member is spherical.

7. A force detector comprising:
a casing including a bottom wall portion formed of a base substrate, a peripheral wall portion, and a top wall portion;
a force sensor element provided on a front surface of the base substrate and received in the casing;
a force transmission member operable to transmit a force to the force sensor element;
a plurality of solderable terminals provided on a back surface of the base substrate and externally exposed; and
a soldering portion provided on the back surface of the base substrate and formed of a solderable material in a prescribed region centering on a position at which an imaginary extension line of a force, which is applied to the force sensor element from the force transmission member, passes through the base substrate, wherein:
the prescribed region encompasses a projection region defined by projecting a deformation region of the force sensor element, which is deformed when the force transmission member transmits a force to the force sensor element, onto the base substrate;
the plurality of solderable terminals are terminal electrodes comprised of four soldering land electrodes formed respectively at four corners of the base substrate; and the four soldering land electrodes are shaped such that a part of each of the terminal electrodes is located within the projection region to form the soldering portion.

* * * * *